(12) United States Patent
Mareachen et al.

(10) Patent No.: US 8,203,593 B2
(45) Date of Patent: Jun. 19, 2012

(54) AUDIO VISUAL TRACKING WITH ESTABLISHED ENVIRONMENTAL REGIONS

(75) Inventors: Russell Mareachen, Winfield, IL (US); Daniel Alan Linzmeier, Wheeling, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 723 days.

(21) Appl. No.: 11/966,271

(22) Filed: Dec. 28, 2007

(65) Prior Publication Data

US 2009/0167874 A1    Jul. 2, 2009

(51) Int. Cl.
*H04N 7/14* (2006.01)
*H04N 5/225* (2006.01)

(52) U.S. Cl. .................. 348/14.08; 340/207.11
(58) Field of Classification Search .... 348/14.01–14.16, 348/207.11
See application file for complete search history.

(56) References Cited

U.S. PATENT DOCUMENTS

| | | | |
|---|---|---|---|
| 5,959,667 A * | 9/1999 | Maeng | 348/211.99 |
| 7,057,636 B1 * | 6/2006 | Cohen-Solal et al. | 348/14.08 |
| 7,230,639 B2 * | 6/2007 | Ferren et al. | 348/14.08 |
| 7,623,156 B2 * | 11/2009 | Nimri et al. | 348/211.12 |
| 2004/0233273 A1 * | 11/2004 | Ferren et al. | 348/14.08 |
| 2005/0041111 A1 | 2/2005 | Matsuoka | |
| 2005/0073574 A1 | 4/2005 | Krisbergh et al. | |
| 2006/0187305 A1 | 8/2006 | Trivedi et al. | |
| 2006/0187306 A1 | 8/2006 | Matsui | |
| 2006/0195475 A1 | 8/2006 | Logan et al. | |

FOREIGN PATENT DOCUMENTS

EP    1628480 A2    2/2006
WO    WO 98/19458    *    5/1998

* cited by examiner

*Primary Examiner* — Trung Diep
(74) *Attorney, Agent, or Firm* — Daniel K. Nichols; Valerie M. Davis; Kenneth A. Haas

(57) ABSTRACT

A method, apparatus, and electronic device for audio-video conferencing are disclosed. A memory may store an initial historical configuration parameter representation of an initial historical configuration parameter for a set of historical video data. A processor may determine a primary initial configuration parameter based on the initial historical configuration parameter representation. An audio-video capture mechanism may capture a current set of video data using the primary initial configuration parameter. An audio input may receive an audio trigger. A configuration control mechanism may switch automatically between the primary initial configuration parameter and a primary subsequent configuration parameter based on the audio trigger.

17 Claims, 9 Drawing Sheets

*300*

| Characteristic 602 | Weight 604 | Pan 606 | Tilt 608 | Zoom 610 | Bright 612 | Tint 614 | Contrast 616 | SF 618 |
|---|---|---|---|---|---|---|---|---|
| Area of Interest | | | | | | | | |
| Population | | | | | | | | |
| Age | | | | | | | | |
| Gender | | | | | | | | |
| Size | | | | | | | | |
| Individual | | | | | | | | |

*Figure 6*
600

AUDIO VISUAL TRACKING WITH ESTABLISHED ENVIRONMENTAL REGIONS

FIELD OF THE INVENTION

The present invention relates to a method and system for teleconferencing. The present invention further relates to using past shot configuration parameters to determine optimal current configuration parameters.

INTRODUCTION

Teleconferencing is no longer limited to strictly an audio conversation. Advances in the speed and bandwidth of data transmission now make it possible to perform video teleconferencing over great distances. A video capture mechanism may be used to create video data streams of any number of subjects. A user may focus the video capture mechanism on one or more subjects, allowing a user at the other end of the video teleconference to see all participants of the teleconference.

SUMMARY OF THE INVENTION

A method, apparatus, and electronic device for audio-video conferencing are disclosed. A memory may store an initial historical configuration parameter representation of an initial historical configuration parameter for a set of historical video data. A processor may determine a primary initial configuration parameter based on the initial historical configuration parameter representation. An audio-video capture mechanism may capture a current set of video data using the primary initial configuration parameter. An audio input may receive an audio trigger. A configuration control mechanism may switch automatically between the primary initial configuration parameter and a primary subsequent configuration parameter based on the audio trigger.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates in a block diagram one embodiment of a configuration parameter entry stored in a window of interest library.

DETAILED DESCRIPTION OF THE INVENTION

Figure 1:
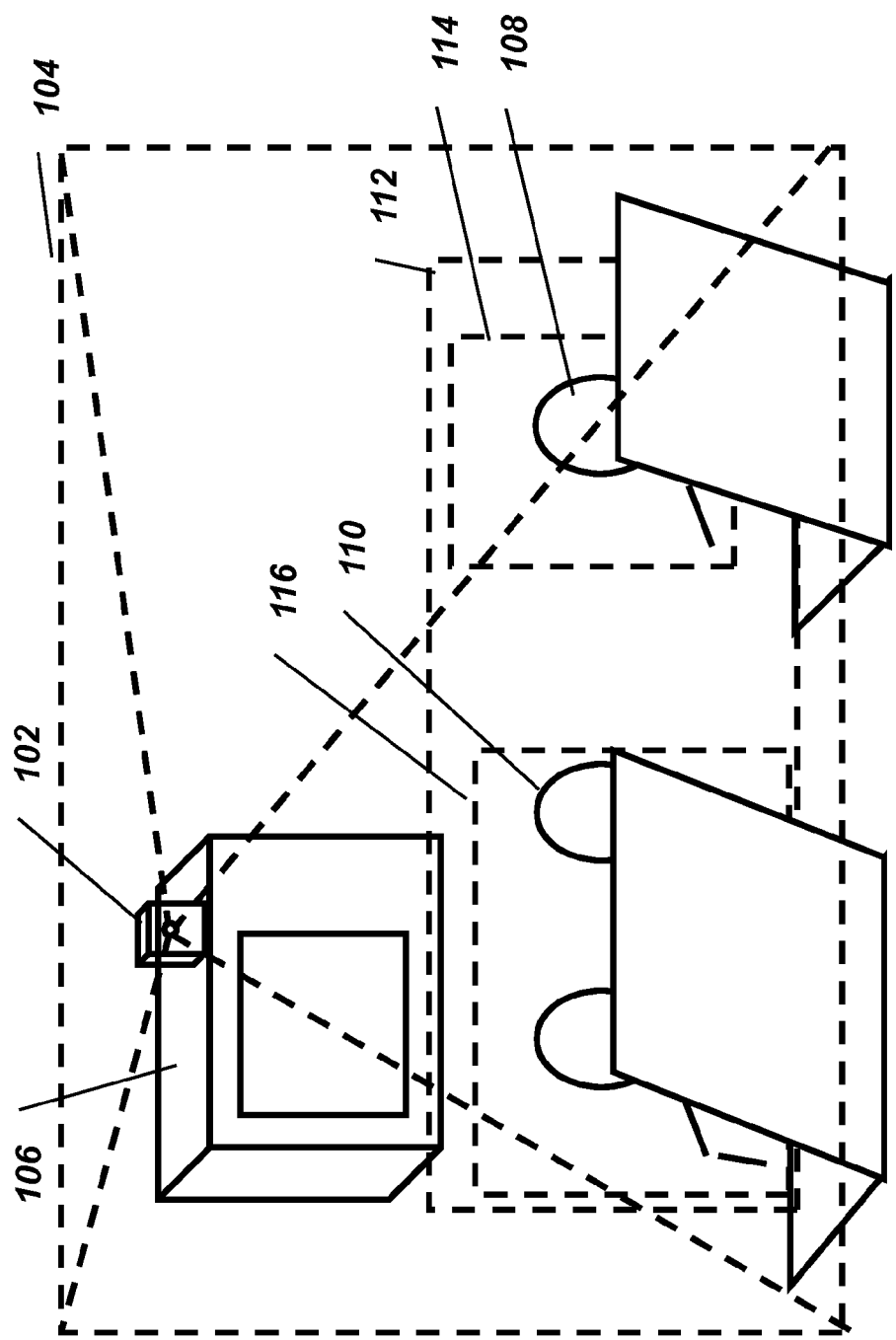
FIG. 1 illustrates in a block diagram one embodiment of an audio-video teleconference.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for audio-video conferencing are disclosed. The audio-video teleconferencing system may record, or capture, one or more subjects as audio and video data to be transmitted to one or more complementary systems across a network. The audio-video teleconferencing system may analyze the historical settings, or configuration parameters, of a set of historical video data to determine the preferred configuration parameters to capture a set of current video data. A series of sample images, representing a set of primary initial configuration parameters and one or more sets of alternate initial configuration parameters, may be presented to a user to allow the user to select the preferred set of configuration parameters.

Additionally, the multiple configuration parameters may be used to provide alternate views when multiple subjects are present. The video capture mechanism may switch between views based upon an input event, such as an audio trigger. As each subject speaks, or otherwise becomes active, the video capture mechanism may reconfigure the settings to a prearranged set of subsequent configuration parameters to focus on the active subject.

A memory may store an initial historical configuration parameter representation of an initial historical configuration parameter for a set of historical video data. A processor may determine a primary initial configuration parameter based on the initial historical configuration parameter representation. An audio-video capture mechanism may capture a current set of video data using the primary initial configuration parameter. An audio input may receive an audio trigger. A configuration control mechanism may switch automatically between the primary initial configuration parameter and a primary subsequent configuration parameter based on the audio trigger.

FIG. 1 illustrates in a block diagram one embodiment of an audio video teleconference 100. An audio-video capture mechanism 102 may capture video data of any object within a viewing range 104. A display 106 may display to a user any object at the opposite end of the teleconference connection. A single user 108 or multiple users 110 may be subjects of the viewing range 104. The audio-video capture mechanism 102 may begin a teleconference by capturing an establishing shot 112 of all of the subjects in the viewing range 104. The audio-video capture mechanism 102 may follow the establishing shot 112 with a single user close up shot 114 or a multiple user close up shot 116.

Figure 2:
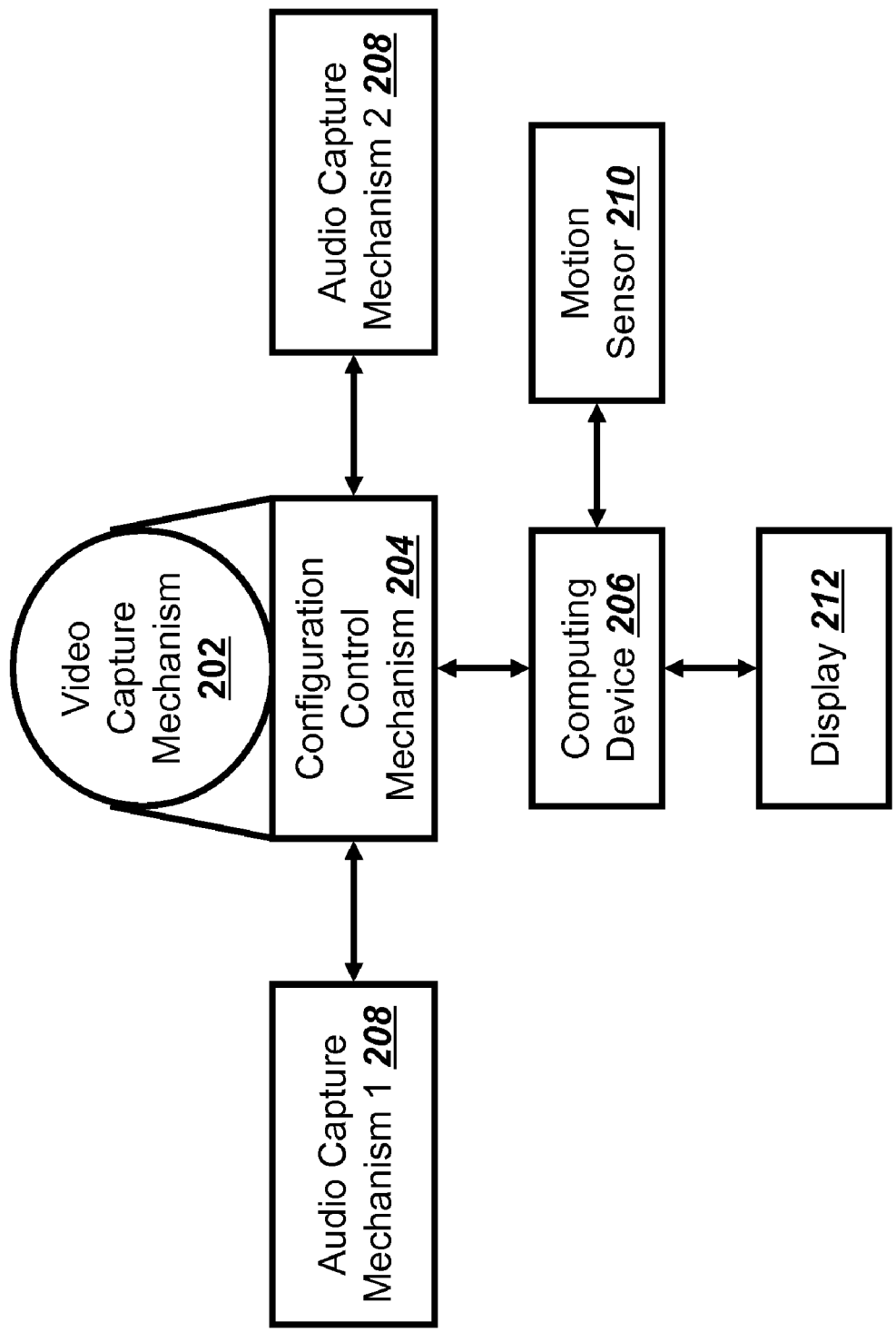
FIG. 2 illustrates in a block diagram one embodiment of an audio-video teleconferencing system.

FIG. 2 illustrates in a block diagram one embodiment of an audio-video teleconferencing system 200. A video capture mechanism 202, such as a digital video camera, may capture visual images as a set of video data. The term video capture mechanism 202 may refer to a device that just captures video data or a device that captures video data and audio data. A configuration control mechanism 204 may apply a configuration parameter to the video capture mechanism 202, such as pan, tilt, zoom, brightness, tint, contrast, and other camera settings. A computing device 206 may be used to determine configuration parameters for the video capture mechanism 202 and feed those configuration parameters to the configuration control mechanism 204. An audio capture mechanism 208, such as a microphone, may capture a subject's speech and other ambient sound as audio data. The audio-video teleconferencing system 200 may have multiple audio capture mechanisms 208 to capture and differentiate multiple audio sources. The multiple audio capture mechanisms 208 may be used to determine which subject the video capture mechanism 202 should be focused on at any given time by triangulating the location of an audio source. A motion sensor 210 may detect motion within a viewing range 104 but out of the focus of the video capture mechanism 202. The display 212 may be used to display a user at a different location of the teleconference.

Figure 3:
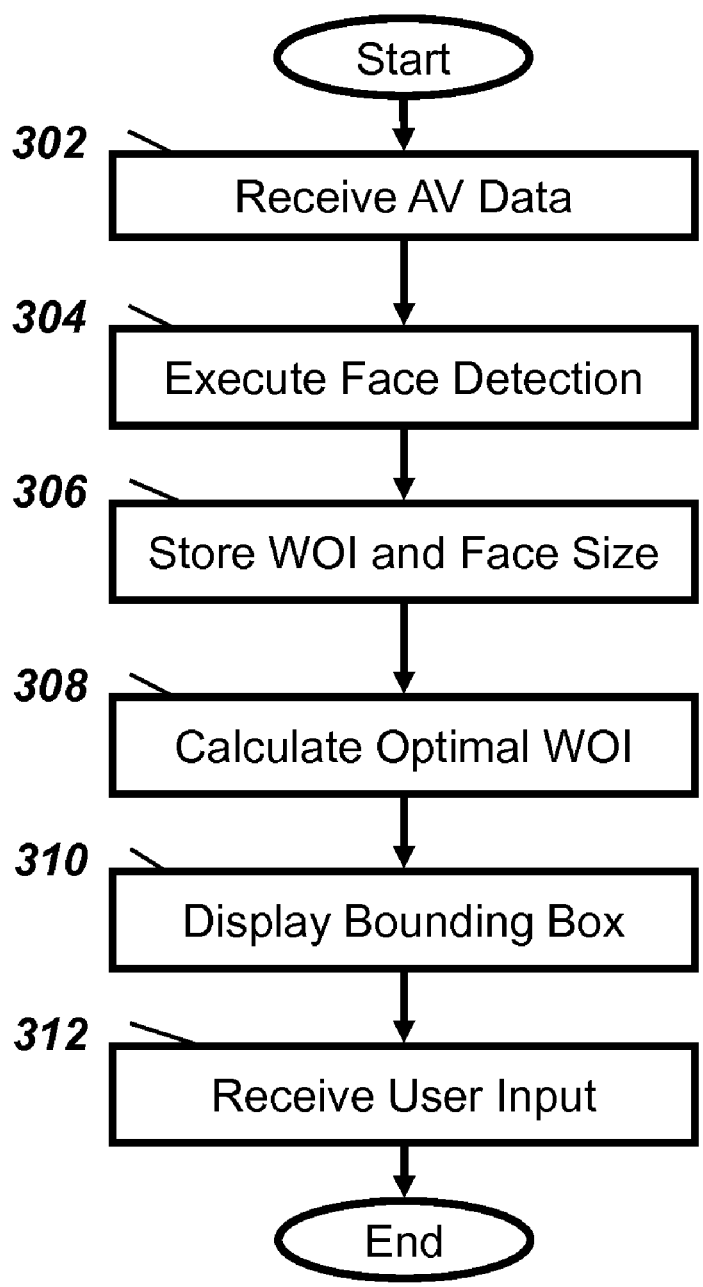
FIG. 3 illustrates in a flowchart one embodiment of a method for determining an optimal window of interest for the video capture mechanism.

FIG. 3 illustrates in a flowchart one embodiment of a method 300 for determining an optimal window of interest (WOI) for the video capture mechanism 202. The audio-video (AV) teleconferencing system may receive AV data (Block 302). The AV teleconferencing system 200 may receive the AV data by capturing the data or by having the data uploaded from a memory source or other sources. The AV teleconferencing system 200 may execute a face detection software program on the AV data to determine subjects of interest (Block 304). The AV teleconferencing system 200 may store a WOI and a face size for each subject in the AV data (Block 306). The AV teleconferencing system 200 may calculate an optimal WOI based on the face size (Block 308). The AV teleconferencing system 200 may display a bounding box on a video image based on the optimal WOI (Block 310). The AV teleconferencing system 200 may receive user input indicating approval of, disapproval of, or adjustment to the framing of the bounding box (Block 312).

Figure 4:
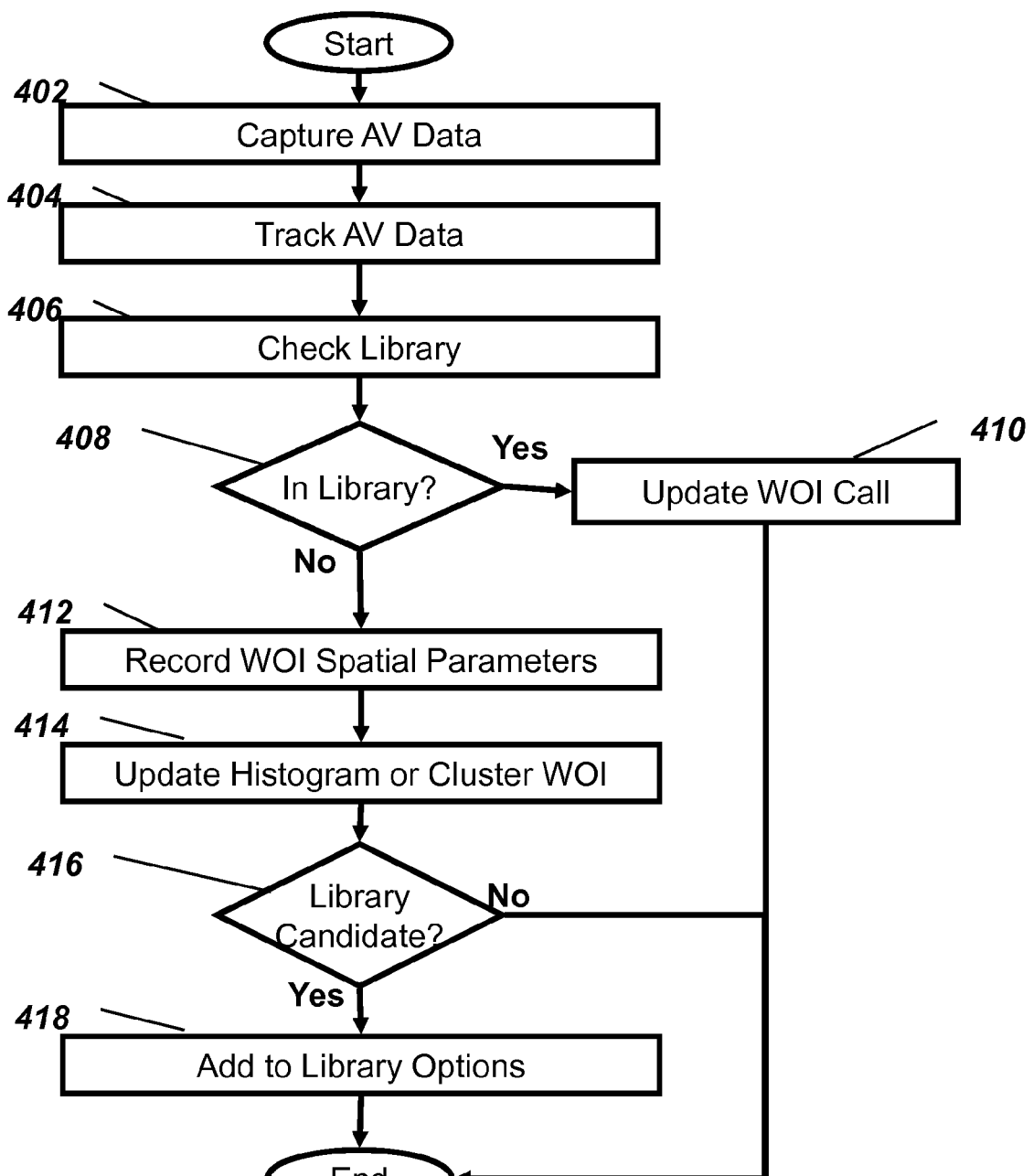
FIG. 4 illustrates in a flowchart one embodiment of a method of creating a library shot.

FIG. 4 illustrates in a flowchart one embodiment of a method 400 of creating a library shot. The library shots may be kept in a library stored in a memory, database, or other recording medium. The AV teleconferencing system 200 may capture AV data (Block 402). The AV teleconferencing system 200 may track the AV data as the AV data is captured (Block 404). The AV teleconferencing system 200 may check the library for shots with a WOI similar to the WOI of the video data being captured (Block 406). If a shot with a similar WOI is found in the library (Block 408), the AV teleconferencing system 200 may update the WOI configuration parameters call to use the library WOI configuration parameters (Block 410). If no shot with a similar WOI is found in the library (Block 408), the AV teleconferencing system 200 may record the spatial parameters of the current WOI (Block 412). The AV teleconferencing system 200 may perform a temporal histogram or incrementally cluster the current WOI configuration parameters (Block 414). If the current WOI is a library candidate (Block 416), the AV teleconferencing system 200 may add the WOI as a library option to be reviewed by the user (Block 418).

Figure 5:
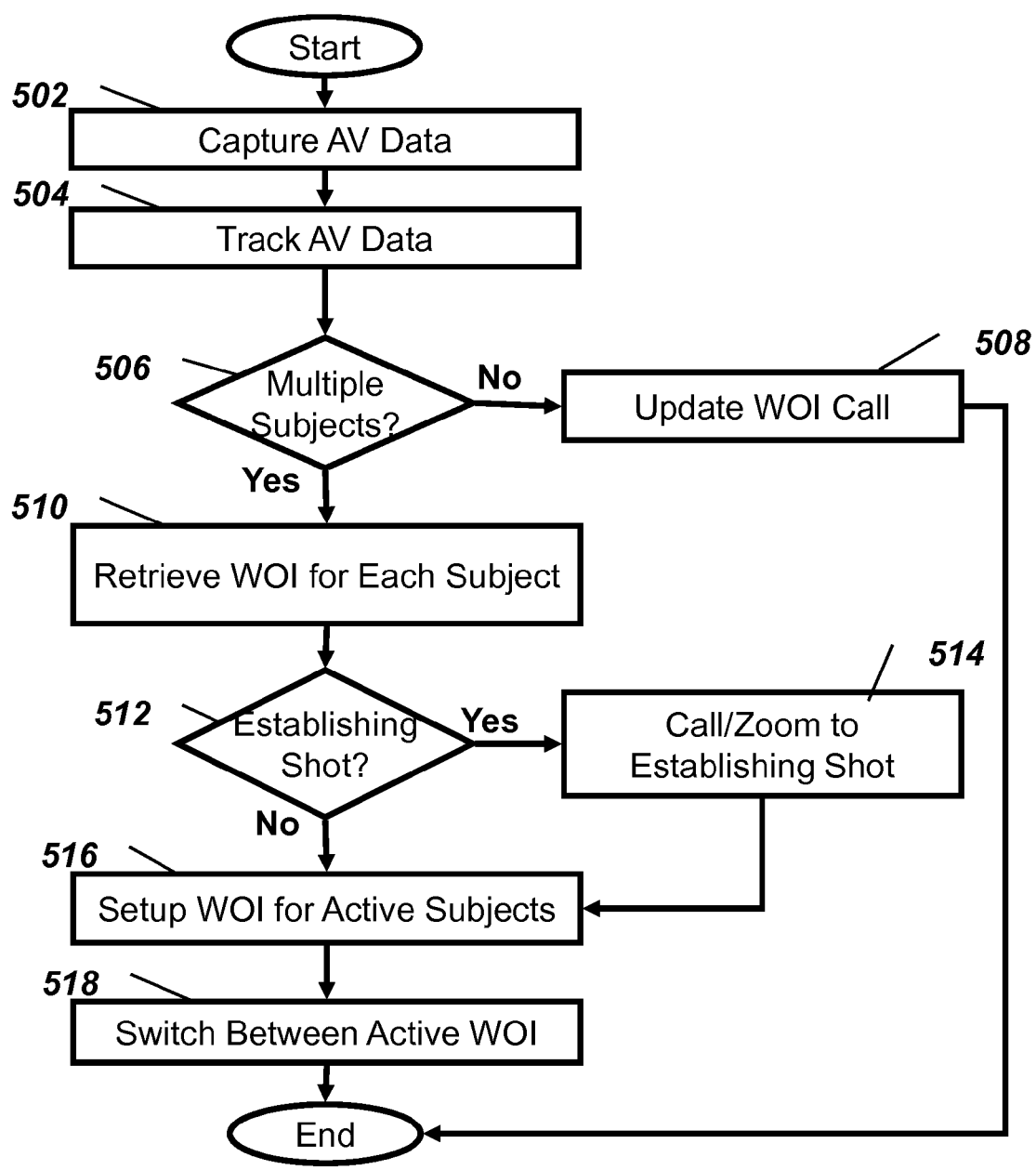
FIG. 5 illustrated in a flowchart one method of cleantly framing multiple users within a viewing range.

FIG. 5 illustrated in a flowchart one method 500 of cleanly framing multiple users within a viewing range 104. The AV teleconferencing system 200 may capture AV data (Block 502). The AV teleconferencing system 200 may track the AV data as the AV data is captured (Block 504). If only a single subject is present (Block 506), the AV teleconferencing system 200 may update the WOI configuration parameters call to use library WOI configuration parameters (Block 508). If multiple subjects are present (Block 506), the AV teleconferencing system 200 may retrieve multiple WOI configuration parameters from the library for each subject (Block 510). If an establishing shot is used (Block 512), the AV teleconferencing system 200 may call an establishing shot from the library or zoom in to create an establishing shot (Block 514). If no establishing shot is used (Block 512), the AV teleconferencing system 200 may setup a WOI shot for each active subject (Block 516). The AV teleconferencing system 200 may switch between the subsequent configuration parameters (SCP) for each active WOI shot as the situation requires (Block 518).

FIG. 6 illustrates in a block diagram one embodiment of a configuration parameter entry 600 stored in a WOI library. The entry 600 may be organized by video subject characteristic (VSC) 602. The VSC 602 may include area of interest, population, age of subject, gender of subject, size of subject, or other characteristics. The area of interest may refer to the position of the subject within the viewing range 104. The population may refer to the number of subjects within the viewing range 104. The age of the subject may be of interest to distinguish between adults and children, referencing the size and activity level of the subject. The gender of the subject may be of interest due to the size differences between a man and woman. The size of the subject will determine its position. Additionally, facial recognition software or login data may be used to further create a more accurate characteristic by uniquely identifying each subject. Configuration parameters may be uniquely associated with each subject, as opposed to a group of subjects.

Each characteristic 602 may be assigned a weight 604, allowing certain characteristics 602 to have priority in instances where more than one characteristic 602 are relevant. Each characteristic 602 may have an assigned set of configuration parameters, such as pan 606, tilt 608, zoom 610, brightness 612, tint 614, contrast 616, or other settings. Additionally, a characteristic 602 may be assigned a switching factor (SF) 618, which identifies the likelihood that a subject or group of subjects will switch between multiple shots. For example, a child may be more likely to move around during a long teleconference, requiring the configuration parameters to change more rapidly.

Figure 7:
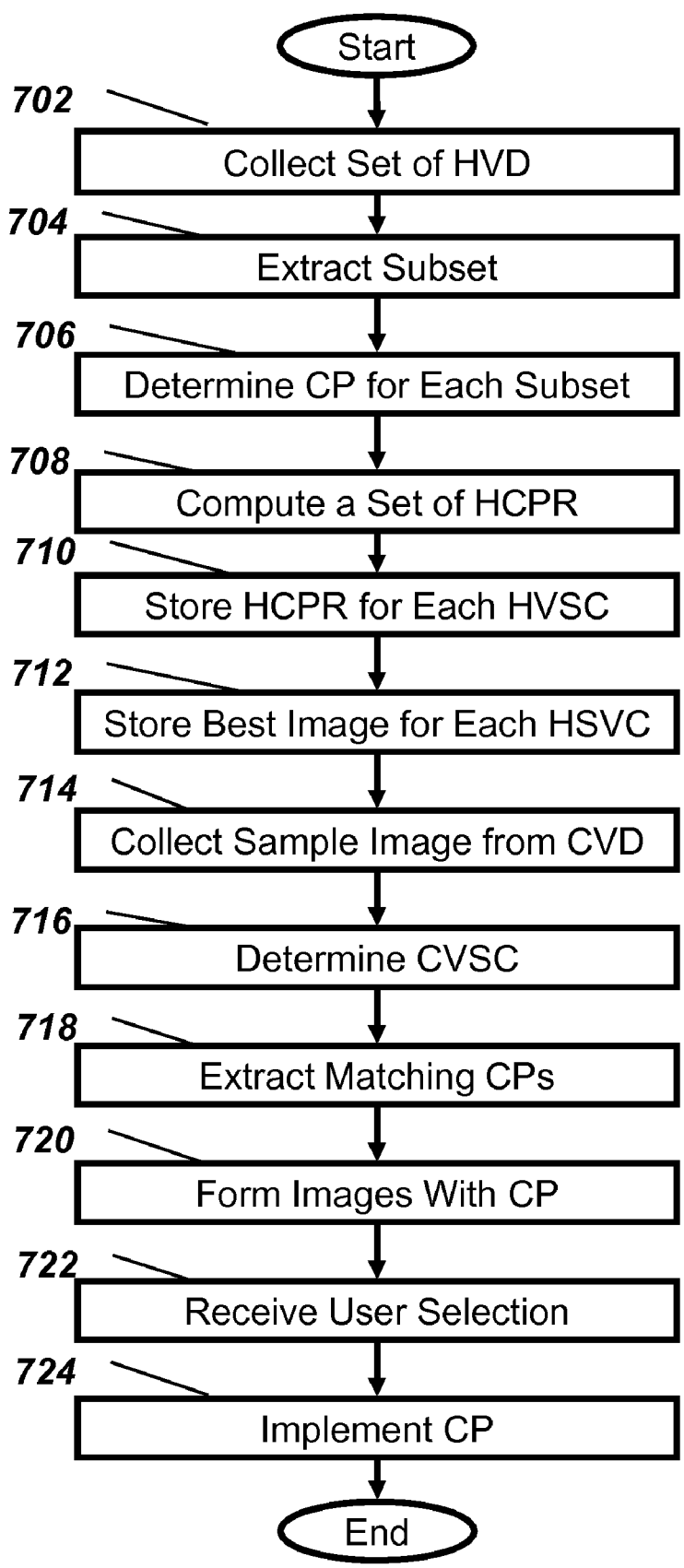
FIG. 7 illustrates in a flowchart one embodiment of a method of creating an optimal set of configuration parameters to create an optimal set of shots for video teleconferencing.

FIG. 7 illustrates in a flowchart one embodiment of a method 700 of creating an optimal set of configuration parameters to create an optimal set of shots for video teleconferencing. The AV teleconferencing device 200 may collect a set of historical video data (HVD) (Block 702). The AV teleconferencing device 200 may collect the set of HVD over time or have a previously collected set of HVD uploaded. The AV teleconferencing device 200 may extract a subset of the collected HVD that each have a matching historical video subject characteristic (HVSC) (Block 704). The AV teleconferencing device 200 may determine one or more configuration parameters (CP) for each subset (Block 706). The AV teleconferencing device 200 may compute a set of one or more historical configuration parameter representations (HCPR) for the subset (Block 708). The AV teleconferencing device 200 may compute a primary HCPR and one or more alternates. The AV teleconferencing device 200 may store one or more HCPRs for each HSVC (Block 710). The HCPR may represent configuration parameters for multiple sets of HVD. For example, the pan setting for images having a given characteristic may be averaged over time. The AV teleconferencing device 200 may store a best image match included within the HCPR for each HVSC (Block 712). The AV teleconferencing device 200 may collect a sample image from the set of current video data (CVD) upon the initiation of capture (Block 714). The AV teleconferencing device 200 may determine a set of current video subject characteristics (CVSC) from the sample image (Block 716). The AV teleconferencing device 200 may associate a historical video subject characteristic of the set of historical video data with the primary initial configuration parameters, compare the historical video subject characteristic to a current video subject characteristic, and extract a set of CPs matching the CVSC (Block 718). The AV teleconferencing device 200 may extract a set of primary configuration parameters and one or more set of alternate configuration parameters. The AV teleconferencing device 200 may form a set of sample images with the extracted set of CPs to be shown to the user (Block 720). The AV teleconferencing device 200 may receive a user selection of a sample image representing the shot preferred by the user (Block 722). The AV teleconferencing device 200 may implement the selected CPs to create the desired shot (Block 724).

Figure 8:
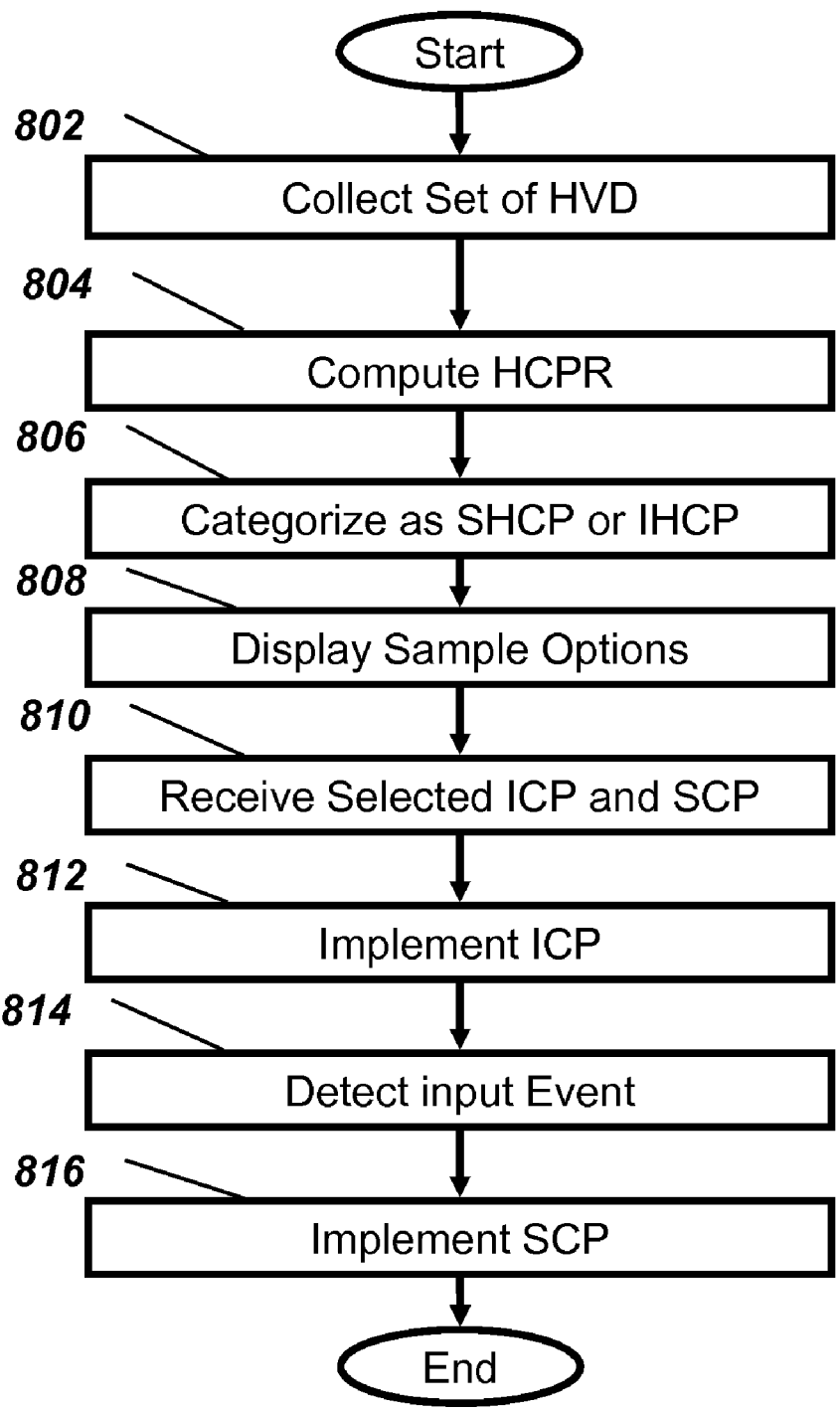
FIG. 8 illustrates in a flowchart one embodiment of a method of creating an optimal set of configuration parameters and switching between optimal shots using an input trigger.

FIG. 8 illustrates in a flowchart one embodiment of a method 700 of creating an optimal set of configuration parameters and switching between optimal shots using an input trigger. The AV teleconferencing device 200 may collect a set of HVD (Block 802). The AV teleconferencing device 200 may collect the set of HVD over time or have a previously collected set of HVD uploaded. The AV teleconferencing device 200 may compute a set of one or more CPRs for the subset (Block 804). The AV teleconferencing device 200 may compute a primary CPR and one or more alternates. The AV teleconferencing device 200 may categorize the historical CP as an initial historical CP (IHCP) or as a subsequent historical CP (SHCP) (Block 806). This categorization may be performed to differentiate the CP for establishing shots from the CP for close up shots. At the initiation of capture of CVD, the AV teleconferencing device 200 may display sample shots using primary initial configuration parameters, alternate initial configuration parameters, primary subsequent configuration parameters, and alternate subsequent configuration parameters (Block 808). The AV teleconferencing device 200 may receive the user selection of a set of initial CPs (ICPs) and a set of subsequent CPs (SCPs) (Block 810). The AV teleconferencing device 200 may implement the set of ICPs in creating the initial shot of the teleconference (Block 812). Upon detecting an input event (Block 814), the AV teleconferencing device 200 may implement the set of SCP in creating the subsequent shots (Block 816).

The input event may be an audio trigger, a video trigger, a motion trigger, a user input, or other event. The user input may be the click of a mouse, keyboard, or other user input signal. The audio trigger may be sound coming from a different location in the viewing range 102, such as a different subject speaking. The change in audio source location may be detected by triangulating between two or more audio capture mechanisms 208. Video trigger may be movement by the focus object of the video capture mechanism 202 towards a new location within the viewing range 102. A motion event may be detected by a motion sensor connected to the control configuration mechanism 204, to detect movement by a subject that is not the focus object of the video capture mechanism 202.

Figure 9:
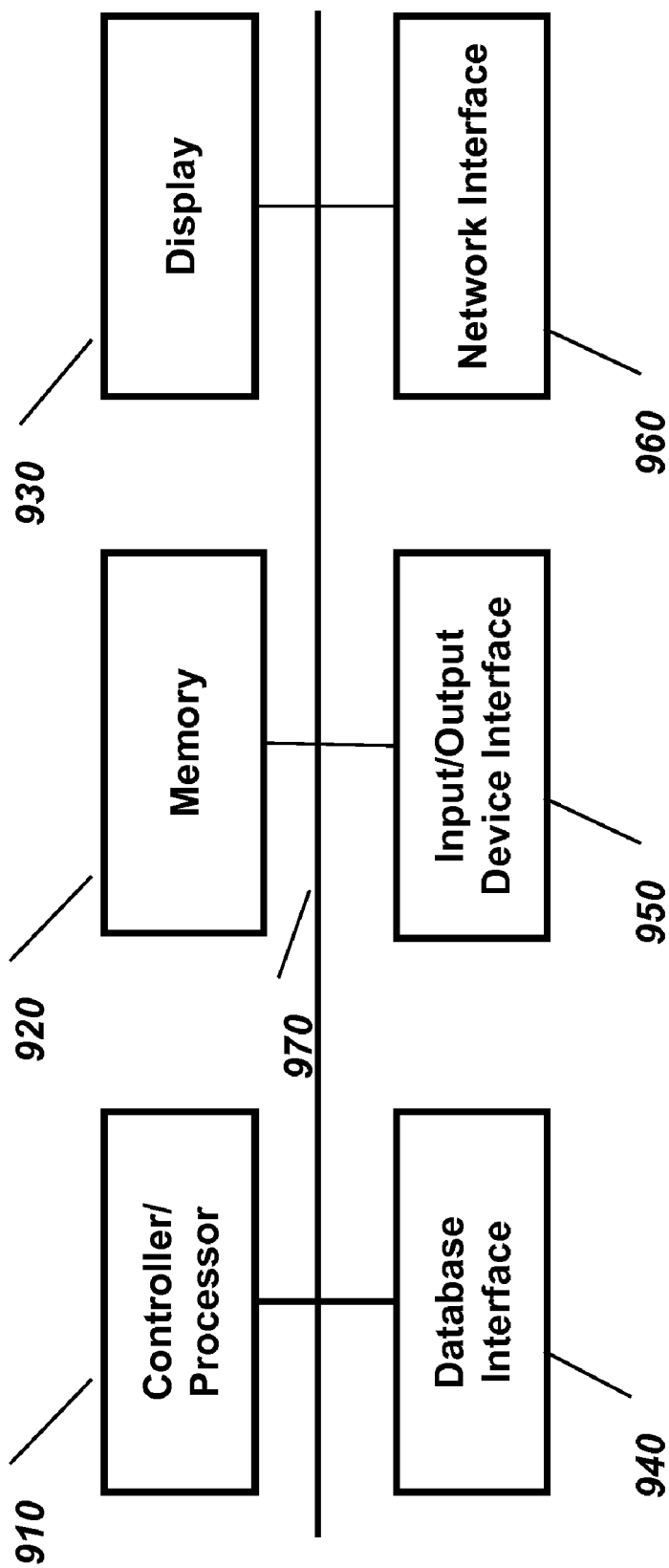
FIG. 9 illustrates a possible configuration of a computing system to act as a telecommunications apparatus or electronic device to execute the present invention.

FIG. 9 illustrates a possible configuration of a computing system 900 to act as a telecommunications apparatus or electronic device to execute the present invention. The computing system 900 may be integrated into the teleconferencing device 102 or may be a separate device connected to the teleconferencing device 100. The computer system 900 may include a controller/processor 910, a memory 920, a display 930, a database interface 940, input/output device interface 950, and a network interface 960, connected through bus 970. The computer system 900 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 910 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 920 may include volatile and nonvolatile data storage, including one or more electrical, magnetic or optical memories such as a random access memory (RAM), cache, hard drive, or other memory device. The memory may have a cache to speed access to specific data. The memory 920 may also be connected to a compact disc-read only memory (CD-ROM), digital video disc-read only memory (DVD-ROM), DVD read write input, tape drive or other removable memory device that allows media content to be directly uploaded into the system.

Data may be stored in the memory or in a separate database. The database interface 940 may be used by the controller/processor 910 to access the database the database may contain a set of initial and subsequent historical configuration parameter representations, as well as any associated historical video subject characteristic.

The Input/Output connection interface 950 may be connected to one or more input devices that may include a keyboard, mouse, pen-operated touch screen or monitor, voice-recognition device, or any other device that accepts input. The Input/Output connection interface 950 may also be connected to one or more output devices, such as a monitor, printer, disk drive, speakers, or any other device provided to output data. The Input/Output connection interface 950 may receive a data task from a user, such as an input trigger signaling that the user wants to switch from the initial view to a subsequent view.

The network connection interface 960 may be connected to a communication device, modem, network interface card, a transceiver, or any other device capable of transmitting and receiving signals over a network. The network connection interface 960 may be used to connect a client device to a network. The network connection interface 960 may be used to connect the teleconference device to the network connecting the user to other users in the teleconference. The components of the computer system 900 may be connected via an electrical bus 970, for example, or linked wirelessly.

Client software and databases may be accessed by the controller/processor 910 from memory 920, and may include, for example, database applications, word processing applications, as well as components that embody the decision support functionality of the present invention. The computer system 900 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for audio-video shot management, comprising:

extracting a set of historical video data of a video capture mechanism that have a matching historical video subject characteristic;

determining a set of initial historical configuration parameters and a corresponding set of initial historical configuration parameter representations for the set of historical video data;

determining a current video subject characteristic from a sample image; and comparing the historical video subject characteristic to the current video subject characteristic to determine, based on an analysis of the set of initial historical configuration parameters, a primary initial configuration parameter for the video capture mechanism to capture a current set of video data based on the set of initial historical configuration parameter representations.

2. The method of claim 1, further comprising:

determining an alternate initial configuration parameter for the video capture mechanism to capture the current video data based on the set of initial historical configuration parameter representations.

3. The method of claim 2, further comprising:

receiving a user selection of the primary initial configuration parameter.

4. The method of claim 1, further comprising:

categorizing a configuration parameter of the set of historical video data as a subsequent historical configuration parameter.

5. The method of claim 4, further comprising:

storing a subsequent historical configuration parameter representation of the subsequent historical configuration parameter; and determining a primary subsequent configuration parameters based on the subsequent historical configuration parameter representation.

6. The method of claim 5, further comprising:

switching automatically between the primary initial configuration parameter and the primary subsequent configuration parameter based on an input.

7. The method of claim 6, wherein the input is at least one of a user input, an audio trigger, a video trigger or a motion trigger.

8. The method of claim 1, wherein the primary initial configuration parameters includes at least one of pan, tilt, zoom, or brightness.

9. The method of claim 1, wherein the current video subject characteristic is one of geographical area of interest, gender of subject, age of subject, size of subject, or number of subjects.

10. The method of claim 1, further comprising weighting the historical video subject characteristic.

11. A teleconference apparatus for audio-video conferencing comprising:
a memory;
a video capture mechanism; and
a processor configured to:
extract a set of historical video data of the video capture mechanism that have a matching historical video subject characteristic;
determine a set of initial historical configuration parameters and a corresponding set of initial historical configuration parameter representations for the set of historical video data;
determine a current video subject characteristic from a sample image; and
compare the historical video subject characteristic to the current video subject characteristic to determine, based on an analysis of the set of initial historical configuration parameters, a primary initial configuration parameter for the video capture mechanism to capture a current set of video data based on the set of initial historical configuration parameter representations.

12. The telecommunications apparatus of claim 11, wherein the processor determines an alternate initial configuration parameter based on the set of initial historical configuration parameter representations.

13. The telecommunications apparatus of claim 11, wherein the memory stores a subsequent historical configuration parameter representation of a subsequent historical configuration parameter of the set of historical video data and the processor determines a primary subsequent configuration parameter based on the subsequent historical configuration parameter representation.

14. The telecommunications apparatus of claim 11, further comprising:
a configuration control mechanism that switches automatically between the primary initial configuration parameter and the primary subsequent configuration parameter based on an input.

15. An electronic device for audio-video recording comprising:
a video capture mechanism;
a processor configured to:
extract a set of historical video data of the video capture mechanism that have a matching historical video subject characteristic;
determine a set of initial historical configuration parameters and a corresponding set of initial historical configuration parameter representations for the set of historical video data;
determine a current video subject characteristic from a sample image; and
compare the historical video subject characteristic to the current video subject characteristic to determine, based on an analysis of the set of initial historical configuration parameters, a primary initial configuration parameter for the video capture mechanism to capture a current set of video data based on the set of initial historical configuration parameter representations;
a memory that stores the primary initial configuration parameter and a primary subsequent configuration parameter;
an audio input that receives an audio trigger; and
a configuration control mechanism that switches automatically between the primary initial configuration parameter and the primary subsequent configuration parameter based on the audio trigger.

16. The electronic device of claim 15, wherein the configuration control mechanism switches automatically between the primary initial configuration parameter and the primary subsequent configuration parameter based on a video trigger.

17. The electronic device of claim 16, wherein the primary initial configuration parameter includes at least one of pan, tilt, zoom, or brightness.

* * * * *

UNITED STATES PATENT AND TRADEMARK OFFICE
CERTIFICATE OF CORRECTION

PATENT NO. : 8,203,593 B2  
APPLICATION NO. : 11/966271  
DATED : June 19, 2012  
INVENTOR(S) : Mareachen et al.

Page 1 of 1

It is certified that error appears in the above-identified patent and that said Letters Patent is hereby corrected as shown below:

ON THE TITLE PAGE

Title Page, in the Figure, for Tag "712", in Line 1, delete "HSVC" and insert -- HVSC --, therefor.

IN THE DRAWINGS

In Fig. 7, Sheet 7 of 9, for Tag "712", in Line 1, delete "HSVC" and insert -- HVSC --, therefor.

IN THE SPECIFICATION

In Column 1, Line 63, delete "cleantly" and insert -- cleanly --, therefor.

In Column 5, Line 10, delete "HSVC" and insert -- HVSC --, therefor.

In Column 6, Line 24, delete "framework" and insert -- framework. --, therefor.

In Column 6, Line 44, delete "ROM," and insert -- ROM) --, therefor.

In Column 6, Line 50, delete "access the database the" and insert -- access the database, the database --, therefor.

In Column 7, Line 34, delete "thereof" and insert -- thereof) --, therefor.

In Column 7, Line 50, delete "thereof" and insert -- thereof) --, therefor.

Signed and Sealed this  
Eleventh Day of June, 2013

Teresa Stanek Rea  
*Acting Director of the United States Patent and Trademark Office*